United States Patent

[11] 3,574,359

| [72] | Inventor | Lee F. Klein<br>North Tonawanda, N.Y. |
|---|---|---|
| [21] | Appl. No. | 843,622 |
| [22] | Filed | July 22, 1969 |
| [45] | Patented | Apr. 13, 1971 |
| [73] | Assignee | General Motors Corporation<br>Detroit, Mich. |

[54] FLUID CONDUIT COUPLING
4 Claims, 4 Drawing Figs.

[52] U.S. Cl. .................................................. 285/86,
 285/305, 285/351
[51] Int. Cl. .................................................. F16l 15/00
[50] Field of Search .......................................... 285/305,
 315, 321, 316, 15, 82, 86, 84, 276, 277, 351,
 (Digest)7, 26; 137/583; 287/135; 85/8.8

[56] References Cited
UNITED STATES PATENTS

| 2,021,241 | 11/1935 | Mall .............................. | 285/305 |
| 2,647,798 | 8/1953 | Ballard ......................... | 285/315X |
| 3,314,696 | 4/1967 | Ferguson et al. ............. | 285/321X |
| 3,352,576 | 11/1967 | Thomsen ...................... | 285/321X |
| 3,453,005 | 7/1969 | Foults .......................... | 285/321X |

FOREIGN PATENTS

| 1,158,329 | 11/1958 | Germany ..................... | 285/Vented |

*Primary Examiner*—Dave W. Arola
*Attorneys*—Paul Fitzpatrick and Jean L. Carpenter ABSTRACT: A readily detachable coupling for conduits for fluid under pressure embodies a socket and a plug which is inserted into the socket and which is in sealing relation with the socket when fully inserted. The socket has a sleeve threaded to its outer surface which serves to retain two axially spaced sets of detents of horseshoe shape, one set of detents retaining the plug in fully inserted position. To disconnect the system, the sleeve is unscrewed and the first set of detents is removed. This allows the plug to move outwardly to an unsealed position to bleed the system, after which the sleeve is further unscrewed to release the second set of detents and allow disconnection of the coupling.

PATENTED APR 13 1971

3,574,359

INVENTOR.
Lee F. Klein
BY
Paul Fitzpatrick
ATTORNEY

FLUID CONDUIT COUPLING

My invention is directed to conduit couplings or hose couplings and is particularly directed to providing a readily connected and disconnected coupling for systems containing fluids under pressure which may be released partially so as to bleed off fluid pressure before being completely disconnected.

More particularly, a coupling according to the preferred embodiment of my invention includes a socket member and a plug member which is inserted into the socket member and has a shoulder by which it is retained by detents mounted in the socket member. The detents are held in engagement with the plug member by a sleeve mounted on the socket member for movement axially thereof. There are two sets of detents so that, upon the release of one set of detents, the coupling may be partially disengaged to bleed off fluid and thereafter the second set of detents may be disengaged to separate the two members of the coupling.

A principal object of my invention is to provide a simple, economical, and safe conduit coupling for high-pressure fluid. A second object is to provide a conduit coupling which may be readily connected and disconnected. A further object is to provide a coupling which may be readily disconnected without use of tools and which has an intermediate disconnect position in which the pressure may leak off but the coupling will not be forcibly disconnected by the pressure contained in the system. A further object is to provide a simple and reliable means of connecting together two axially movable parts.

The nature of my invention and advantages thereof will be apparent to those skilled in the art from the succeeding detailed description of the preferred embodiment of the invention and the accompanying drawings thereof.

Figure 1:
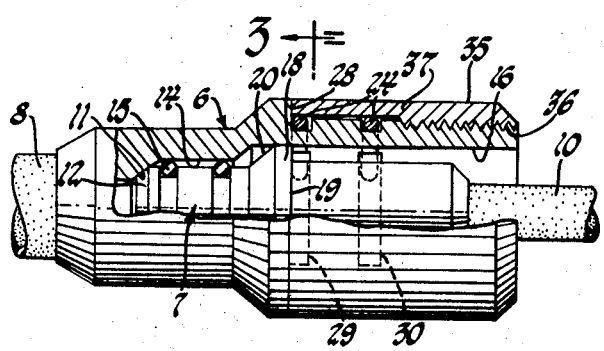
FIG. 1 is an axial view, with parts cut away and in section, of a coupling in fully coupled condition.

Referring to the drawings, the coupling comprises an annular outer or female member or socket 6 and an annular inner or male member or plug 7. The plug is reciprocably received in the socket to couple two conduits 8 and 10 together. These conduits may be, for example, flexible hoses or metal pipes. The mode of their attachment to the socket and plug, being entirely immaterial to the present invention, is not illustrated.

The socket defines a conical seat 11 and the plug has a conical nose 12 which, when the device is fully connected, engage each other. The socket defines a cylindrical bore 14 which cooperates with two O-ring seals 15 mounted in grooves in the outer surface of the plug. These seals cooperate with the plug and socket to prevent any leakage between the two when the plug is fully inserted into the socket.

Figure 3:
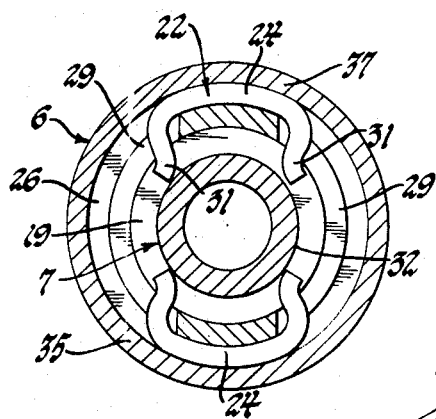
FIG. 3 is a transverse sectional view taken on the plane indicated by the line 3-3 in FIG. 1.
Figure 4:
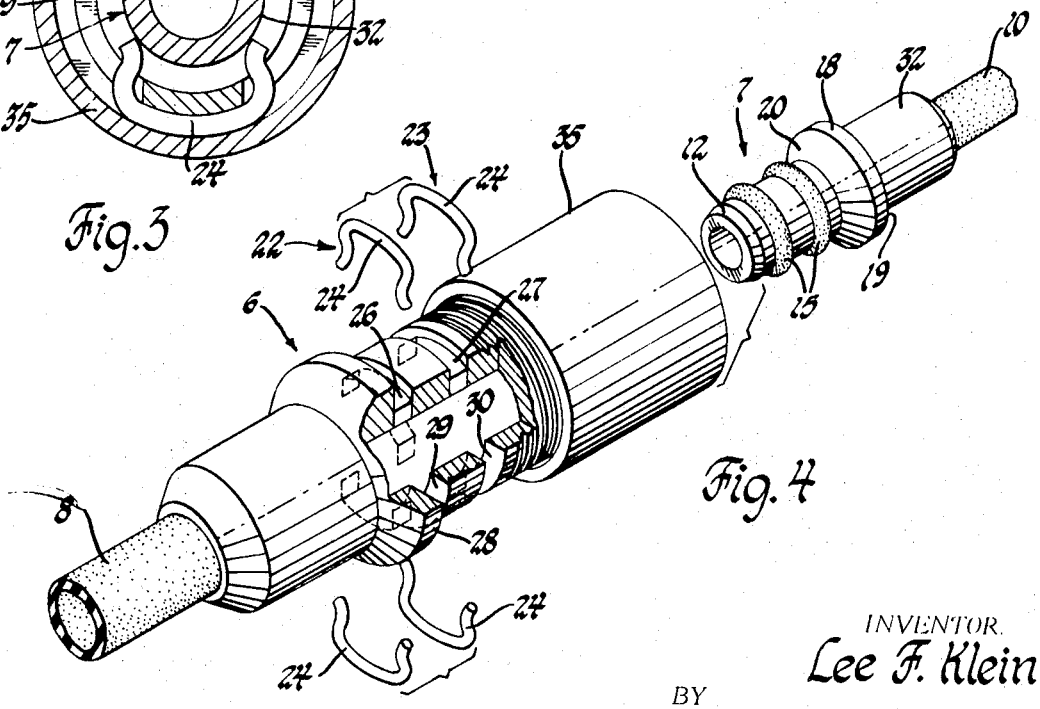
FIG. 4 is an exploded axonometric view of the coupling in disconnected condition.

The socket includes an enlarged bore 16 and the plug includes a flange 18 having a radial rear or outer surface 19 and a conical or ramped forward surface 20. The flange 18 fits slidably with some clearance within the enlarged bore 16. The flange 18 cooperates with two detent means or detent sets 22 and 23 each including two U-shaped wire detents 24. The detents 24, which preferably are of the shape shown clearly in FIG. 3, may be made of round or square wire or other suitable material. The two detent sets 22 and 23 are mounted respectively in circumferential channels 26 and 27 in the outer surface of the socket outwardly of a radial flange 28. The body of the socket is cut entirely through at each side in line with the channels 26 and 27 to provide passage for the detents into engagement with the flange 18 of the plug. The cuts through the socket are indicated at 29 and 30. The central portion of each detent 24 is of such curvature as to fit within the channel 26 or 27 and the end portions are bent to provide legs 31 which extend through the cuts 29 and 30 substantially into engagement with the outer surface of the portion 32 of the plug outboard of the flange 18, in position to bear against the radial flange face 19.

The detents preferably are sufficiently resilient to act as snap rings and flex outwardly so as to ride over the shoulder 18 when cammed outwardly by the ramp face 20 as the plug is inserted into the socket. However, they positively retain the plug against disengagement.

The detents 24 are kept in place by a retainer 35 in the form of a sleeve having an internally threaded portion 36 cooperating with external threads on the socket and having a cylindrical portion 37 which bears against the outer surface of detents 24 and, when the sleeve is fully screwed into place, engages the flange 28. Normally, the sleeve is screwed fully into place and, to effect the mating of the two conduits, it is necessary only to press the coupling into the socket past the second detent so that the plug is seated and the O-ring seals 15 are in sealing engagement with the socket.

Figure 2:
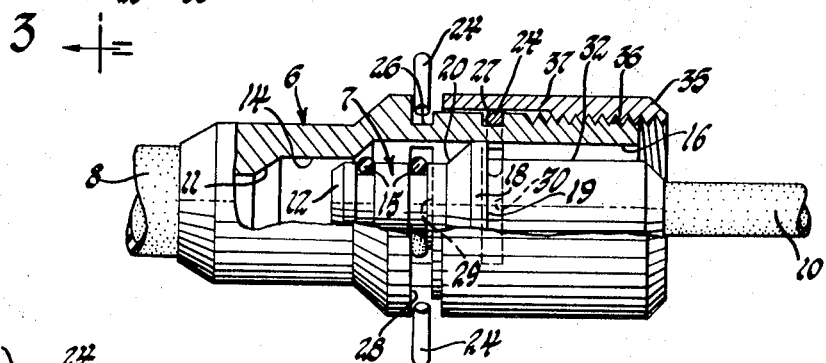
FIG. 2 is a similar view illustrating the coupling in partially released condition.

The plug cannot be pulled out of the socket, however, without unscrewing the sleeve 35 which may be knurled and may be unscrewed manually. To release the coupling, the sleeve 35 is first partially unscrewed to the position shown in FIG. 2, at which point the detents 24 drop out or may be pushed out by pressing against the ends of the legs of the detents. This permits any pressure within the system to push the plug outwardly until its flange 18 engages the second detent means 23 which is at such a position that the O-ring seals are now out of engagement with the socket wall 14. Thus, the pressure can leak through the clearance or sliding fit between flange 18 and the enlarged bore 16 of the socket. When it is observed that the pressure is completely or substantially bled off, the sleeve 35 may be further unscrewed to release the detents 23 and thus permit complete disengagement of the coupling. The detents 24 are then put back in place and the sleeve is screwed home. It will be apparent that either detent 22 or 23 could operate with only one U-shaped detent 24, which might have legs or greater length in this case.

It will be seen from the foregoing that I have provided a simple and effective readily engageable coupling and one which has safety features to permit it to be partially released to relieve the pressure of the system before any complete release of the coupling.

The detailed description of the preferred embodiment of my invention for the purpose of explaining the principles thereof is not to be considered as limiting or restricting the invention, as many modifications may be made by the exercise of skill in the art.

I claim:

1. A fluid conduit coupling comprising, in combination, an outer member defining a receptacle, an inner member slidably received in the receptacle and in sealing relation to the outer member when fully inserted, means defining a shoulder on the inner member, means defining two disengageable positive detent means on the outer member, a first detent means engageable with the shoulder when the inner member is fully inserted to hold the coupling engaged and sealed and a second detent means engageable with the shoulder to retain the inner member within but in nonsealing contact with the outer member to bleed the conduit, and retainer means on the outer member effective to retain both detent means in operative position to engage the shoulder, the retainer means being movable to free sequentially the first detent means and then the second detent means, each detent means including two U-shaped detents spaced circumferentially of the coupling and having legs engageable with the said shoulder, the outer member defining external grooves in which the detents are located and defining external grooves in which the detents are located and defining openings through the outer member for the legs of the detents.

2. A coupling as recited in claim 1 in which the detents are of a spring type and the shoulder has a ramped inner surface so that the coupling can be engaged with the detents in operative position.

3. A coupling as recited in claim 1 in which the retainer means is a sleeve threaded on the outer member.

4. A coupling as recited in claim 1 in which the two said members define between them a restricted passage for bleed of fluid when the shoulder engages the second detent means.

PO-1050
(5/69)

UNITED STATES PATENT OFFICE
CERTIFICATE OF CORRECTION

Patent No. 3,574,359      Dated April 13, 1971

Inventor(s) Lee F. Klein

It is certified that error appears in the above-identified patent and that said Letters Patent are hereby corrected as shown below:

Column 2, lines 69 and 70, starting in line 69, after "defining" delete "external grooves in which the detents are located and defining".

Signed and sealed this 29th day of August 1972.

(SEAL)
Attest:

EDWARD M. FLETCHER, JR.
Attesting Officer

ROBERT GOTTSCHALK
Commissioner of Pat